(12) United States Patent
Liu et al.

(10) Patent No.: US 12,079,407 B2
(45) Date of Patent: *Sep. 3, 2024

(54) TOUCH SENSOR

(71) Applicant: TPK Advanced Solutions Inc., Xiamen (CN)

(72) Inventors: Shao Jie Liu, Xiamen (CN); Si Qiang Xu, Xiamen (CN); Chien Hsien Yu, Hsinchu County (TW); Chia Jui Lin, Taoyuan County (TW); Jian Zhang, Xiamen (CN); Wei Na Cao, Changting County (CN); Mei Fang Lan, Xiamen (CN); Jun Hua Huang, Qingliu County (CN); Mei Fen Bai, Xiamen (CN); Song Xin Wang, Quanzhou (CN)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,253

(22) Filed: Sep. 26, 2023

(65) Prior Publication Data

US 2024/0012499 A1 Jan. 11, 2024

Related U.S. Application Data

(63) Continuation of application No. 17/586,813, filed on Jan. 28, 2022, now Pat. No. 11,809,648.

(51) Int. Cl.
*G06F 3/041* (2006.01)

(52) U.S. Cl.
CPC .................................. *G06F 3/041* (2013.01)

(58) Field of Classification Search
CPC .......... G06F 3/041; G06F 2203/04111; G06F 3/04164; G06F 3/0443; G06F 3/0445; G06F 3/0446; G06F 2203/04103; G06F 2203/04112
See application file for complete search history.

(56) References Cited

U.S. PATENT DOCUMENTS

| | | | |
|---|---|---|---|
| 2014/0035599 A1* | 2/2014 | Shimata | G01R 27/2605 29/850 |
| 2014/0162052 A1* | 6/2014 | Ding | C23C 18/1241 428/335 |
| 2015/0047885 A1* | 2/2015 | Chang | H05K 3/02 156/247 |

(Continued)

*Primary Examiner* — Michael J Jansen, II
*Assistant Examiner* — Sosina Abebe
(74) *Attorney, Agent, or Firm* — Idea Intellectual Limited; Margaret A. Burke; Sam T. Yip

(57) ABSTRACT

A touch sensor includes a substrate, sensing channels, and a protective layer. The sensing channels are disposed at intervals on a surface of the substrate, and any one of the sensing channels includes an electrode portion and a silver trace portion electrically connected to the electrode portion. The protective layer is disposed on the substrate and covers and encapsulates the sensing channels. After the touch sensor is subjected to a salt spray test with sodium chloride solution of a mass percentage concentration of 5% at a rate of 1 mL/H to 2 mL/H under an ambient temperature of 35° C. for 48 hours, a resistance change rate of any one of the sensing channels is less than or equal to 10%, and a resistance distribution difference between the sensing channels is less than or equal to 10%.

10 Claims, 4 Drawing Sheets

(56) References Cited

U.S. PATENT DOCUMENTS

| | | | | |
|---|---|---|---|---|
| 2016/0117032 A1* | 4/2016 | Lin | ................... | G06F 3/04164 |
| | | | | 345/173 |
| 2016/0374238 A1* | 12/2016 | Tanaka | ................ | H05K 9/0088 |
| 2018/0212167 A1* | 7/2018 | Chun | ................... | H10K 50/841 |
| 2018/0348900 A1* | 12/2018 | Heinrich | ............. | B32B 37/1292 |
| 2019/0235690 A1* | 8/2019 | Lee | ....................... | G06F 3/0416 |
| 2020/0409213 A1* | 12/2020 | Takeda | ................... | G06F 3/044 |

* cited by examiner

TOUCH SENSOR

CROSS-REFERENCES TO RELATED APPLICATIONS

This application is a continuation application of U.S. application Ser. No. 17/586,813, filed on Jan. 28, 2022, the disclosure of which is hereby incorporated by reference in its entirety.

BACKGROUND

Field of Disclosure

The present disclosure relates to a touch sensor.

Description of Related Art

For metal materials, the salt spray corrosion is a common and destructive atmospheric corrosion. Chloride ions in the salt spray can penetrate the oxide layer on the surface of the metal material and electrochemically react with the internal metal of the metal material, resulting in defects in the metal material. Therefore, many electronic products are often subjected to a salt spray test to detect their corrosion resistance to the salt spray.

In general, whether an electronic product has passed the salt spray test is usually judged by a naked-eye inspection of the appearance of the electronic product. For example, for a touch sensor, it is usually through a naked-eye inspection to determine whether the metal components such as electrodes and circuits have traces, discoloration, and other changes on the surfaces of the metal components. However, under the requirements of higher quality standards to the electronic product, the traditional naked-eye inspection is unable to accurately determine whether the salt spray test has caused damage to the metal components, which often leads to the distortion of the inspection results and the deterioration of product quality. Therefore, how to provide a touch sensor that can provide a normal operation function after the salt spray test is currently worth studying.

SUMMARY

According to some embodiments of the present disclosure, a touch sensor includes a substrate, a plurality of sensing channels, and a protective layer. The sensing channels are disposed at intervals on a surface of the substrate, and any one of the sensing channels includes an electrode portion and a silver trace portion electrically connected to the electrode portion. The protective layer is disposed on the substrate and covers and encapsulates the sensing channels. After the touch sensor is subjected to a salt spray test with sodium chloride solution of a mass percentage concentration of 5% at a rate of 1 mL/H to 2 mL/H under an ambient temperature of 35° C. for 48 hours, a resistance change rate of any one of the sensing channels is less than or equal to 10%, and a resistance distribution difference between the sensing channels is less than or equal to 10%.

In some embodiments of the present disclosure, the protective layer directly contacts a carrying surface of the substrate and a top surface of the silver trace portion, the protective layer has an upper surface facing away from the substrate, and a vertical distance between the upper surface of the protective layer and the top surface of the silver trace portion is greater than or equal to 20% of a thickness of the silver trace portion.

In some embodiments of the present disclosure, a sum of the vertical distance between the upper surface of the protective layer and the top surface of the silver trace portion and a vertical distance between the top surface of the silver trace portion and the carrying surface of the substrate is less than or equal to 12 μm.

In some embodiments of the present disclosure, a thickness of the silver trace portion is greater than or equal to 1 μm and less than or equal to 9 μm.

In some embodiments of the present disclosure, a water vapor permeability of the protective layer is greater than or equal to 400 g/(m²×day) and less than or equal to 1500 g/(m²×day).

In some embodiments of the present disclosure, the electrode portion is a metal nanowire electrode portion including a matrix and a plurality of metal nanowires distributed in the matrix.

In some embodiments of the present disclosure, at least any one of the sensing channels further includes a metal nanowire trace portion. The metal nanowire trace portion and the silver trace portion are disposed in a stack, the metal nanowire trace portion is between the silver trace portion and the substrate, the metal nanowire trace portion is connected to the metal nanowire electrode portion, the metal nanowire trace portion and the metal nanowire electrode portion are on a same horizontal plane, and the metal nanowire trace portion and the silver trace portion at least constitute a peripheral circuit of the touch sensor.

In some embodiments of the present disclosure, the protective layer directly contacts a carrying surface of the substrate and a top surface of the silver trace portion, the protective layer has an upper surface facing away from the substrate, a vertical distance between the upper surface of the protective layer and the top surface of the silver trace portion is greater than or equal to 20% of a thickness of the silver trace portion, and a sum of the vertical distance between the upper surface of the protective layer and the top surface of the silver trace portion and a vertical distance between the top surface of the silver trace portion and the carrying surface of the substrate is less than or equal to 12 μm.

In some embodiments of the present disclosure, the electrode portion has a mesh pattern, and the electrode portion and the silver trace portion are on a same horizontal plane.

In some embodiments of the present disclosure, the electrode portion at least constitutes a touch electrode of the touch sensor, and the silver trace portion at least constitutes a peripheral circuit of the touch sensor.

According to the aforementioned embodiments of the present disclosure, after the touch sensor of the present disclosure is subjected to the salt spray test for 48 hours, the resistance change rate of any one of sensing channels of the touch sensor is low, and the resistance distribution difference between the sensing channels is low, having the electrical specifications defined by the present disclosure. Accordingly, when inspected by the electrical test which is more rigorous and accurate compared to the appearance inspection, the touch sensor of the present disclosure can be ensured to provide a normal operation function after the salt spray test.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
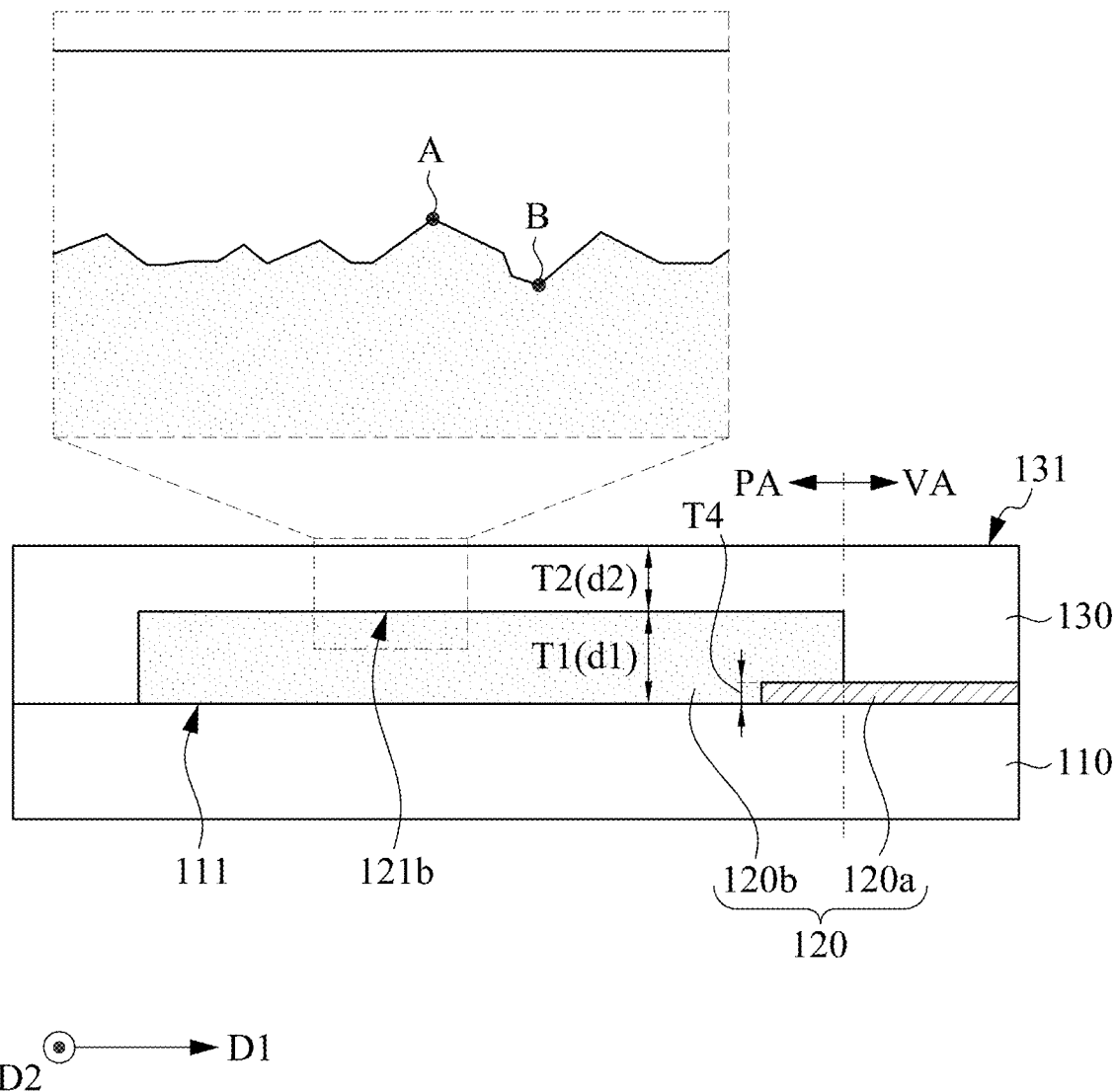
FIG. 1 is a schematic partial cross-sectional view illustrating a touch sensor according to some embodiments of the present disclosure.

Reference will now be made in detail to the present embodiments of the disclosure, examples of which are illustrated in the accompanying drawings. However, it should be understood that these details should not be intend to limit the present disclosure. In addition, for the convenience of readers, the size of each element in the drawings is not illustrated according to actual scale. It should be understood that relative terms such as "lower" or "bottom" and "upper" or "top" can be used herein to describe the relationship between one element and another element, as shown in the figures. It should be understood that relative terms are intended to include different orientations of the device other than those shown in the figures.

Reference is made to FIG. 1, which is a schematic partial cross-sectional view illustrating a touch sensor 100 according to some embodiments of the present disclosure. The touch sensor 100 includes a substrate 110, a plurality of sensing channels 120 (only a portion of one of the sensing channels 120 is shown in FIG. 1), and a protective layer 130. In some embodiments, the touch sensor 100 has a visible area VA and a peripheral area PA, and the peripheral area PA is at least disposed on one side of the visible area VA. The substrate 110 is configured to carry the sensing channels 120 and the protective layer 130, and may be, for example, a rigid transparent substrate or a flexible transparent substrate. In some embodiments, a material of the substrate 110 includes, but is not limited to, transparent materials such as glass, acrylic, polyvinyl chloride, polypropylene, polystyrene, polycarbonate, cycloolefin polymer, cycloolefin copolymer, polyethylene terephthalate, polyethylene naphthalate, colorless polyimide, or combinations thereof. In some embodiments, the substrate 110 may be surface-treated or be coated with coating layers (not shown) with different functional requirements (e.g., optical and reliability requirements). In the present disclosure, these additional surface-treated layers or coating layers are regarded as a portion of the substrate 110.

The sensing channels 120 are disposed on the carrying surface 111 of the substrate 110 at intervals, and a single sensing channel 120 extends from the visible area VA to the peripheral area PA to form an electron transferring path across the visible area VA and the peripheral area PA. Specifically, a single sensing channel 120 includes an electrode portion 120a and a silver trace portion 120b, in which the electrode portion 120a is located in the visible area VA and partially extends into the peripheral area PA so as to achieve a touch function, and the silver trace portion 120b is located in the periphery area PA and electrically connected to the electrode portion 120a so as to transmit signals to an electronic component such as an external controller. In other words, the electrode portion 120a can at least constitute a touch electrode of the touch sensor 100, and the silver trace portion 120b can at least constitute a peripheral circuit of the touch sensor 100. In the embodiment shown in FIG. 1, the electrical connection between the electrode portion 120a and the silver trace portion 120b is achieved by covering a portion of the silver trace portion 120b with the electrode portion 120a which extends into the peripheral area PA. That is, the electrode portion 120a and the silver trace portion 120b are overlapped with each other in the peripheral area PA of the touch sensor 100 to be electrically connected to each other.

The electrode portion 120a can have a variety of configurations, and a variety of materials can be chosen as the material of the electrode portion 120a, such that the touch sensor 100 can provide diverse and wide applications. In some embodiments, the electrode portion 120a may be a single-sided single-layer, double-sided single-layer, single-sided double-layer, or bridge-type single-layer electrode structure disposed on the substrate 110. In the embodiment shown in FIG. 1, the electrode portion 120a is an example of a single-layer electrode structure disposed on a single surface (side) of the substrate 110, in which a plurality of the electrode portion 120a are arranged in a non-interlaced manner. For example, the electrode portions 120a may be strip-shaped electrodes extending along a first direction D1 and arranged at intervals along a second direction D2, in which the first direction D1 is perpendicular to the second direction D2. In some embodiments, the electrode portion 120a may be, for example, a metal nanowire electrode portion, a metal electrode portion, or a metal oxide electrode portion. Specifically, the metal nanowire electrode portion may include a matrix and a plurality of metal nanowires distributed in the matrix, in which the matrix may include polymers such as polyacrylate, epoxy resin, polysiloxane, polysilane, poly (silicon-acrylic acid), polyurethane, or mixtures thereof, and the metal nanowires may include silver nanowires, gold nanowires, copper nanowires, nickel nanowires, or combinations thereof. Specifically, the metal electrode portion may include silver metal or copper metal, and when the electrode portion 120a is the metal electrode portion, the electrode portion 120a may further be designed to have a special pattern, such as a mesh pattern formed by a plurality of interlaced thin metal lines, such that visibility of the electrode portion 120a is reduced. In addition, the electrode portion 120a and the silver trace portion 120b are on a same horizontal plane (i.e., the electrode portion 120a is coplanar with the silver trace portion 120b, which is not shown in the drawings). Specifically, the metal oxide electrode portion may include indium tin oxide, indium zinc oxide, cadmium tin oxide, aluminum-doped zinc oxide, or combinations thereof. In the following embodiments, the electrode portion 120a is exemplified by the metal nanowire electrode portion.

The silver trace portion 120b includes silver metal. The silver trace portion 120b can be formed on the carrying surface 111 of the substrate 110 and on at least a portion of the electrode portion 120a extending into the peripheral area PA by screen printing, and the silver trace portion 120b has a top surface 121b (i.e., a surface of the silver trace portion 120b (facing) away from the substrate 110) after being formed. Specifically, solution including silver paste may be formed on the substrate 110 by screen printing, and then the solution may be cured/dried, such that a silver layer is formed all over the peripheral area PA. Then, the silver layer is patterned, such that the silver trace portion 120b is formed in the peripheral area PA.

The protective layer 130 is disposed on an entire surface of the substrate 110, and the coverage of the protective layer 130 includes the visible area VA and the peripheral area PA, so as to cover each of the sensing channels 120 on the substrate 110. That is, the protective layer 130 covers each of the electrode portions 120a and each of the silver trace portions 120b. In some embodiments, the material of the protective layer 130 can be an insulating material such as acrylic material, fluorine-including acrylic material, epoxy resin, or combinations thereof, in which the acrylic material can be, for example, poly(methylmethacrylate) (PMMA). The protective layer 130 can protect the sensing channels 120 from being corroded by water vapor, such that the electrical specifications of the touch sensor 100 of the present disclosure at least meet the relationships of Equation (1) and Equation (2) after being subjected to a salt spray test with sodium chloride solution of a mass percentage concentration of 5% and a PH value of 6.5 to 7.2 at a rate of 1 mL/H to 2 mL/H for 48 hours (for the operation method of the salt spray test, please refer to the standard method GB/T2423.17: 2008 "Environmental Testing of Electrical and Electronic Products, Part II: Test method Ka: salt spray"). Equation (1) and Equation (2) are reproduced below:

$$(R_{T48}-R_{T0})/R_{T0} \leq 10\%, \quad \text{Equation (1)}$$

$$(R_{MAX}-R_{MIN})/(R_{MAX}+R_{MIN}) \leq 10\%. \quad \text{Equation (2)}$$

In Equation (1), $R_{T0}$ is the resistance of any one of the sensing channels 120 of the touch sensor 100 before the salt spray test, and $R_{T48}$ is the resistance of the same sensing channel 120 after 48 hours of the salt spray test. In other words, Equation (1) represents that after the touch sensor 100 is subjected to the salt spray test for 48 hours, the resistance change rate of any one of the sensing channels 120 is less than or equal to 10%. In Equation (2), $R_{MAX}$ is the resistance of the sensing channel 120 with the largest resistance among all of the sensing channels 120 after 48 hours of the salt spray test, and $R_{MIN}$ is the resistance of the sensing channel 120 with the smallest resistance among all of the sensing channels 120 after 48 hours of the salt spray test. In other words, Equation (2) represents that after the touch sensor 100 is subjected to the salt spray test for 48 hours, the resistance distribution difference between all of the sensing channels 120 is less than or equal to 10%. It should be understood that "the resistance distribution difference between the sensing channels 120" in the present disclosure refers to "the degree of the resistance difference between the sensing channels 120". When the resistance distribution difference between the sensing channels 120 is smaller, the resistance distribution range of all of the sensing channels 120 is smaller, and the resistance of all of the sensing channels 120 is closer. Based on satisfying the above electrical specifications, the touch sensor 100 of the present disclosure. Based on satisfying the above electrical specifications, the touch sensor 100 provided by the present disclosure can provide a normal touch operation function after the salt spray test regardless of whether there are traces or discoloration on the appearance of the top surface 121b of the silver trace portion 120b.

Figure 2:
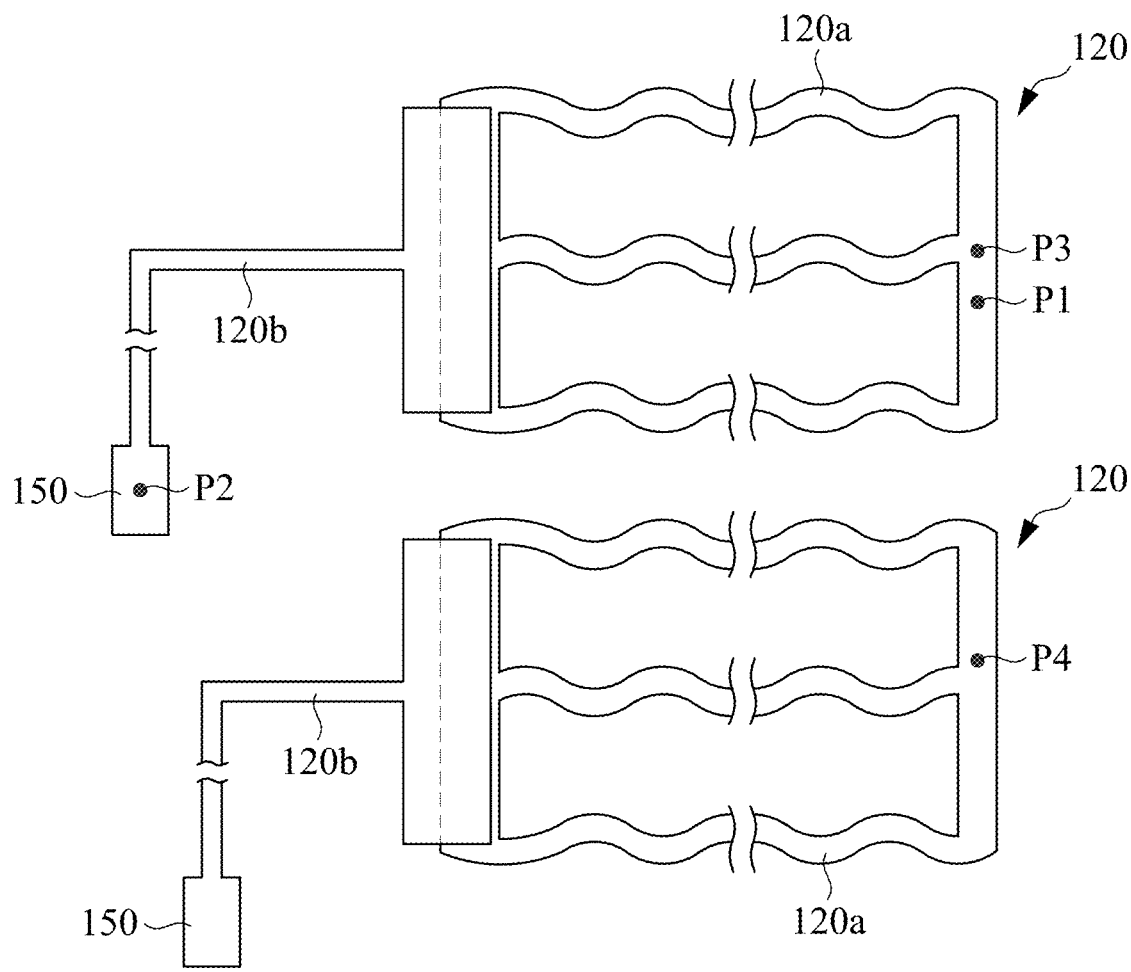
FIG. 2 is a schematic view illustrating a measurement method of resistance of the sensing channels according to some embodiments of the present disclosure.

A method for measuring resistance of the sensing channels 120 is further supplemented. Reference is made to FIG. 2, which is a schematic view illustrating a measurement method of resistance of the sensing channels 120. In the measurement method, the measurement equipment is Fluke multimeter (model: F287C) with a first probe and a second probe, and the measurement is carried out under a normal temperature environment. Specifically, the measurement method includes the following steps. Step 1: Turn on the power of the measurement equipment, and set the equipment's rotary switch to resistance measurement position. Step 2: Bring the two probes into contact with each other to calibrate for zeroing. Step 3: Placing the calibrated first probe to contact any position P1 of an end of an electrode portion 120a of a sensing channel 120, and placing the calibrated second probe after to contact any position P2 of an end of a silver trace portion 120b of the same sensing channel 120 which is usually designed as a conductive pad 150, such that the resistance of the sensing channel 120 is measured. Step 4: repeating Step 3 for three times, calculating an average value of the three resistance obtained by the three measurements, and regarding the average value as the resistance of the sensing channel 120. After the above steps, the resistance $R_{T0}$ in Equation (1) can be obtained. Next, after the touch sensor 100 is subjected to the salt spray test under the aforementioned conditions for 48 hours, the touch sensor 100 is removed from the salt spray test environment, and then Step 1 to Step 4 are sequentially carried out on the same sensing channel 120 of which the resistance $R_{T0}$ has been measured, such that the resistance $R_{T48}$ in Equation (1) can be obtained. In addition, after the touch sensor 100 subjected to the salt spray test under the aforementioned conditions for 48 hours, the touch sensor 100 is removed from the salt spray test environment, and then Step 1 to Step 4 are sequentially carried out on all of the sensing channels 120, such that the resistance $R_{MAX}$ and $R_{MIN}$ in Equation (2) can be obtained.

In some embodiments, the electrical specifications of the touch sensor 100 may further satisfy the condition of "the insulation resistance between two adjacent sensing channels 120 of the sensing channels 120 is greater than or equal to 100 MΩ" to ensure that no short circuit occurs between adjacent sensing channels 120. The method for measuring the insulation resistance may include the following steps. Firstly, the aforementioned Step 1 and Step 2 are sequentially performed. Next, after Step 2 is performed, the calibrated first probe is placed to contact any position P3 of any of the touch sensing channels 120, and then the calibrated second probe is placed to contact any position P4 of a sensing channel 120 adjacent to the sensing channel 120 that is in contact with the calibrated first probe. Accordingly, the insulation resistance between the two adjacent sensing channels 120 is obtained.

A special design between the protective layer 130 and the silver trace portion 120b of the touch sensor 100 is further discussed in the following. The protective layer 130 directly contacts the carrying surface 111 of the substrate 110 and the top surface 121b of the silver trace portion 120b, and the protective layer 130 has an upper surface 131 facing away from the substrate 110. Through the design of the relationship between a vertical distance d2 between the top surface 131 of the protective layer 130 and the top surface 121b of the silver trace portion 120b (i.e., a thickness T2 of the protective layer 130 directly above the silver trace portion 120b) and a vertical distance d1 between the top surface 121b of the silver trace portion 120b and the carrying surface 111 of the substrate 110 (i.e., a thickness T1 of the silver trace portion 120b), and through the design of the material properties of the protective layer 130, the touch sensor 100 of the present disclosure can be ensured to pass the electrical test which is more rigorous and accurate compared to the appearance inspection after being subjected to the salt spray test for 48 hours. In the following description, "the relationship between the thickness T2 of the protective layer 130 and the thickness T1 of the silver trace portion 120b" and "the material properties of the protective layer 130" will be sequentially discussed.

Regarding the design of "the relationship between the thickness T2 of the protective layer 130 and the thickness T1 of the silver trace portion 120b", in general, when the thickness T2 of the protective layer 130 covering the top of the silver trace portion 120b is larger, the protection of the protective layer 130 for the silver trace portion 120b is stronger. That is, when the thickness T2 of the protective layer 130 increases, the protective layer 130 gives a positive impact on the probability of the touch sensor 100 passing the electrical test after the salt spray test. However, if the thickness T2 of the protective layer 130 is too large, the optical properties of the touch sensor 100 may be adversely affected, the bendability of the touch sensor 100 may be limited, and the cost may be increased. After comprehensively considering the above factors, the thickness T2 of the protective layer 130 and the thickness T1 of the silver trace portion 120b of the present disclosure are designed to meet the relationships of Equation (3) and Equation (4) reproduce below:

$$T2 \geq T1 \times 20\%, \quad \text{Equation (3):}$$

$$T1 + T2 \leq 12 \mu m. \quad \text{Equation (4):}$$

In Equation (3) and Equation (4), T1 is the thickness of the silver trace portion 120b, and T2 is the thickness of the protective layer 130 covering from the top of the silver trace portion 120b. In other words, Equation (3) represents that the thickness T2 of the protective layer 130 covering from the top of the silver trace portion 120b is greater than or equal to 20% of the thickness T1 of the silver trace portion 120b. That is, the vertical distance d2 between the upper surface 131 of the protective layer 130 and the top surface 121b of the silver trace portion 120b is greater than or equal to 20% of the thickness T1 of the silver trace portion 120b. In addition, Equation (4) represents a sum of the thickness T1 of the silver trace portion 120b and the thickness T2 of the protective layer 130 covering from the top of the silver trace portion 120b is less than or equal to 12 μm. That is, a sum of the vertical distance d2 between the upper surface 131 of the protective layer 130 and the top surface 121b of the silver trace portion 120b and the vertical distance d1 between the top surface 121b of the silver trace portion 120b and the carrying surface 111 of the substrate 110 is less than or equal to 12 μm. Since the thickness T2 of the protective layer 130 and the thickness T1 of the silver trace portion 120b meet the relationships of Equation (3) and Equation (4), the touch sensor 100 can meet the electrical, reliability, optical, and structural (e.g., bendability) requirements of the touch sensor 100.

In some embodiments, the protective layer 130 can be formed on the substrate 110 by screen printing. Based on the limit of the total thickness of the protective layer 130 that can be formed by a single screen-printing process, the sum of the thickness T1 of the silver trace portion 120b and the thickness T2 of the protective layer 130 covering the silver trace portion 120b is controlled to be less than or equal to 12 μm in the present disclosure. As such, the touch sensor 100 can meet the electrical, reliability, optical, and structural (e.g., bendability) requirements of the touch sensor 100 under the premise of only performing the screen-printing process once to form the protective layer 130 and taking into account the cost considerations. For example, an insulating material with a thickness of about 6 μm to 8 μm can be formed on the silver trace portion 120b by a single screen-printing process, and the insulating material that is not fully cured (i.e., not fully shaped) may partially flow into the intervals between the adjacent silver trace portions 120b.

Accordingly, the sum of the thickness T2 of the protective layer 130 cured and covering the silver trace portion 120b and the thickness T1 of the silver trace portion 120b (i.e., the thickness T1+thickness T2) is controlled to be less than or equal to 12 μm. In other words, in order to meet the requirements of the electrical properties and reliability of the touch sensor 100, if the sum of the thickness T1 and the thickness T2 is designed to be greater than 12 μm, multiple screen-printing processes will be performed, which may lead to an increase in cost and an increase in the overall thickness of the touch sensor 100, resulting in failure to meet the aforementioned requirements of the present disclosure. As a supplementary note, a person having ordinary skill in the art can understand that the factors affecting the thickness of a layer formed by screen printing may include, for example, parameters such as squeegee speed of screen-printing, screen mesh count, squeegee pressure of screen-printing, etc.

As another supplementary note, during the screen-printing process of the silver trace portion 120b, the silver paste may be picked up by the screen printing plate while removing the screen printing plate, resulting in a slight uneven and undulating appearance on the top surface 121b of the silver trace portion 120b formed. Therefore, when viewed on a microscopic scale, the top surface 121b of the silver trace portion 120b is usually a non-planar surface as shown in the partially enlarged region in FIG. 1. In the present disclosure, a degree of uniformity of the top surface 121b of the silver trace portion 120b can be further quantified through the "uniform percentage, expressed by the symbol U (%), of which the unit is %". More specifically, the uniform percentage of the top surface 121b of the silver trace portion 120b can be defined by Equation (5) reproduced below:

$$U(\%) = [(D_{MAX} - D_{MIN})/(D_{MAX} + D_{MIN})] \quad \text{Equation (5):}$$

In Equation (5), $D_{MAX}$ is a vertical distance between the carrying surface 111 of the substrate 110 and the highest point A of the top surface 121b of one selected silver trace portion 120b, in which the highest point A is selected among 4 points randomly selected on the top surface 121b of the selected silver trace portion 120b when observing from the optical microscope within the observation range of 10 times the objective lens and 10 times the eye lens; $D_{MIN}$ is a vertical distance between the carrying surface 111 of the substrate 110 and the lowest point B of the top surface 121b of the selected silver trace portion 120b among the above selected 4 points. When the degree of uniformity of the top surface 121b of the silver trace portion 120b is quantified by Equation (5), it is preferable to control the uniformity distribution to be greater than or equal to 10% and less than or equal to 30%. When the uniformity distribution is larger, the height difference between each point on the top surface 121b of the silver trace portion 120b is larger (i.e., the degree of fluctuation is larger), and the top surface 121b of the silver trace portion 120b is more uneven and undulating. Since the uniformity distribution of the top surface 121b of the silver trace portion 120b is controlled within the above-mentioned suitable range, the additional influence made by the uniformity distribution of the top surface 121b of the silver trace portion 120b on the design of the relationships between the thickness T2 of the protective layer 130 and the thickness T1 of the silver trace portion 120b can be further reduced.

In addition, since the silver trace portion 120b may be formed by screen printing, the viscosity of the silver paste may affect the thickness T1 of the silver trace portion 120b, and may also affect the degree of uniformity (uniformity distribution) of the top surface 121b of the silver trace portion 120b. In general, when the viscosity of the silver paste is higher, the thickness T1 of the silver trace portion 120b formed by screen printing can be larger, and the trace resistance of the silver trace portion 120b can be smaller. However, when the viscosity of the silver paste is higher, the controllability of screen printing for the silver paste may be worse, resulting in a worse (a higher) uniformity distribution of the top surface 121b of the silver trace portion 120b. The viscosity of the silver paste used in the present disclosure may be greater than or equal to 1000 cp and less than or equal to 100000 cp. When the viscosity of the silver paste is 1000 cp, the thickness T1 of the silver trace portion 120b that can be implemented is greater than or equal to 1 μm and less than or equal to 2 μm, and the uniformity distribution of the top surface 121b of the silver trace portion 120b can be controlled to be about 10%; when the viscosity of the silver paste is 100000 cp, the thickness T1 of the silver trace portion 120b that can be implemented is greater than or equal to 6 μm and less than or equal to 9 μm, and the uniformity distribution of the top surface 121b of the silver trace portion 120b can be controlled to be about 30%. In other words, in consideration of reliability and electrical properties, the thickness T1 of the silver trace portion 120b of the present disclosure is preferably designed to be greater than or equal to 1 μm and less than or equal to 9 μm, such that the uniformity distribution of the top surface 121b of the silver trace portion 120b can be greater than or equal to 10% and less than or equal to 30%. Accordingly, the silver trace portion 120b can meet the electrical transmission requirements, and the additional influence made by the uniformity distribution of the top surface 121b of the silver trace portion 120b on the design of the relationships between the thickness T2 of the protective layer 130 and the thickness T1 of the silver trace portion 120b can be further reduced, in which the relationships between the thickness T2 of the protective layer 130 and the thickness T1 of the silver trace portion 120b are designed to meet the reliability requirements.

The above supplementary note to the uniformity distribution is mainly for explaining that the deviation caused by the uniformity distribution of the top surface 121b of the silver line portion 120b is implied in the thicknesses T1 and T2 in Equation (3) and Equation (4) of the present disclosure. In addition, since the thickness T1 of the silver trace portion 120b is generally much larger than the thickness T4 of the electrode portion 120a (the thickness T1 of the silver trace portion 120b is generally about 100 times the thickness T4 of the electrode portion 120a), the thickness T4 of the electrode portion 120a is negligible at the overlapping position of the silver trace portion 120b and the electrode portion 120a. That is, the thickness T4 of the electrode portion 120a does not affect the interpretation of the relationships of Equation (3) and Equation (4). In more detail, at the overlapping position of the silver trace portion 120b and the electrode portion 120a, the thickness T1 of the silver trace portion 120b can be regarded as the vertical distance d1 between the top surface 121b of the silver trace portion 120b and the carrying surface 111 of the substrate 110.

Regarding the design of "the material properties of the protective layer 130", the water vapor permeability of the protective layer 130 may affect the water blocking ability of the protective layer 130, which further affects the protection of the protective layer 130 to the silver trace portion 120b. In general, when the water vapor permeability of the protective layer 130 is lower, the water blocking ability of the protective layer 130 is stronger, and the protection that can be provided for the silver trace portion 120b is stronger. However, when the water vapor permeability of the protective layer 130 is lower, the degree of curing of the protective layer 130 is higher, the hardness of the protective layer 130 is greater, the bending property of the protective layer 130 is poorer, and the protective layer 130 is more expensive, which are not conducive to reducing costs. After comprehensively considering the above factors, the water vapor permeability of the protective layer 130 of the present disclosure is designed to be greater than or equal to 400 g/(m²×day) and less than or equal to 1500 g/(m²×day). As such, during the salt spray test, the protective layer 130 is not only designed in terms of structure (e.g., the relationships of thickness), but also material properties to provide better protection, such that the silver trace portion 120b can be protected from water vapor erosion, the bendability of the touch sensor 100 can be taken into consideration, and the costs can be reduced. In addition, when the electrode portion 120a of the touch sensor 100 of the present embodiment is, for example, the metal nanowire electrode portion as described above, the protective layer 130 having the above-mentioned water vapor permeability can further effectively prevent the metal nanowires in the metal nanowire electrode portion from influence made by water vapor. That is, the protective layer 130 can avoid constructing an environment that facilitates ion migration, thereby avoiding ion migration of the metal nanowires in the electrode portion 120a or slowing down the ion migration rate of the metal nanowires and helping to improve the reliability of the touch sensor 100.

Figure 3:
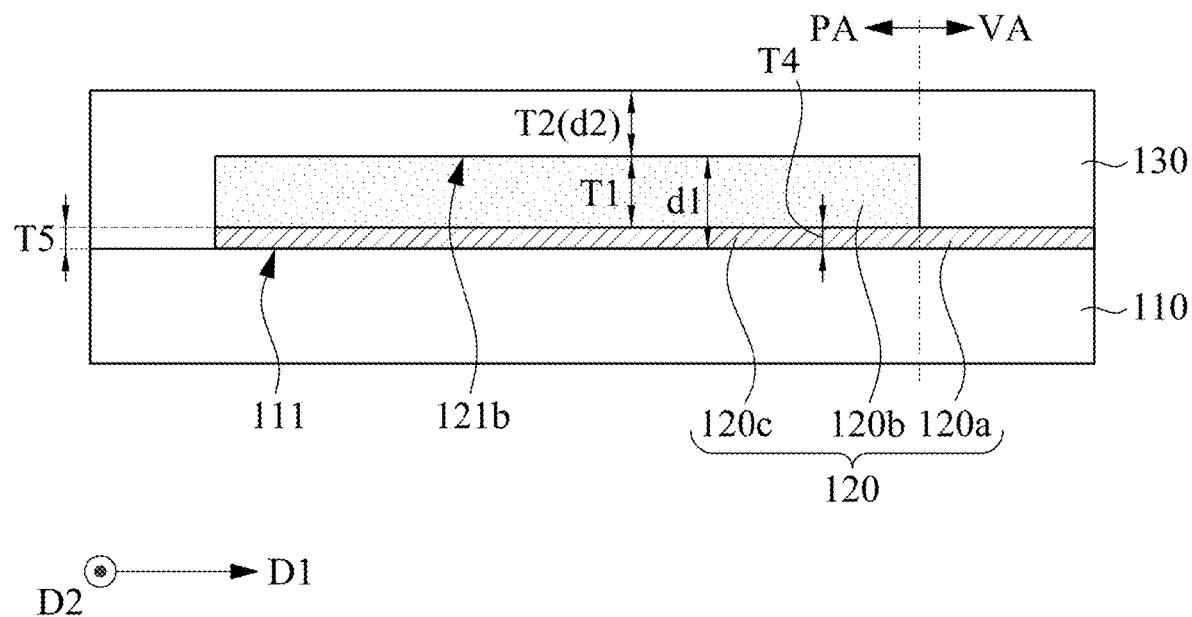
FIG. 3 is a schematic partial cross-sectional view illustrating a touch sensor according to some other embodiments of the present disclosure.

Reference is made to FIG. 3, which is a schematic partial cross-sectional view illustrating a touch sensor 100a according to some other embodiments of the present disclosure. At least one difference between the embodiment of FIG. 3 and the embodiment of FIG. 1 is that the sensing channel 120 of the touch sensor 100a in FIG. 3 further includes a metal nanowire trace portion 120c stacked with the silver trace portion 120b, in which the metal nanowire trace portion 120c is disposed between the silver trace portion 120b and the substrate 110, and the metal nanowire trace portion 120c contacts the silver trace portion 120b. The metal nanowire trace portion 120c includes a matrix and a plurality of metal nanowires distributed in the matrix. In some embodiments, when the electrode portion 120a is the metal nanowire electrode portion 120a, the metal nanowire trace portion 120c and the metal nanowire electrode portion 120a are connected to each other and are integrally formed on a same horizontal plane (i.e., the metal nanowire trace portion 120c and the metal nanowire electrode portion 120a are coplanar). In addition, the metal nanowire trace portion 120c and the silver trace portion 120b may at least constitute a peripheral circuit of the touch sensor 100. Based on the above, by integrally forming the metal nanowire electrode portion 120a and the metal nanowire trace portion 120c to directly form an electrical connection (i.e., by making the metal nanowire electrode portion 120a and the metal nanowire trace portion 120c belong to different portions of a single-layer metal nanowire layer), there is no need for an additional contact structure for realizing the electrical contact between the peripheral circuit and the touch electrode, such that an area occupied by the contact structure in the peripheral area PA can be saved.

It is worth noting that since the thickness T5 of the metal nanowire trace portion 120c is the same as the thickness T4 of the metal nanowire electrode portion 120a (i.e., the thickness T1 of the silver trace portion 120b is also much larger than the thickness T5 of the metal nanowire trace portion 120c), for the embodiment shown in FIG. 3, when calculating the relationships of the aforementioned Equation (3) and Equation (4), the thickness T5 of the metal nanowire trace portion 120c and the thickness T4 of the metal nanowire electrode portion 120a are both negligible. In other words, the thickness T1 of the silver trace portion 120b can be regarded as the vertical distance d1 between the top surface 121b of the silver trace portion 120b and the carrying surface 111 of the substrate 110.

Hereinafter, the features and effects of the present disclosure will be verified in more detail with reference to the touch sensors of each embodiment and each comparative example. Reference is made to Table 1, which lists the electrical properties of touch sensors with the silver trace portions 120b with different thicknesses T1 and the protective layers 130 with different thicknesses T2 after being subjected to the salt spray test for 48 hours. In Table 1, the stack structure of each touch sensor is the same as the stack structure shown in FIG. 1. In the embodiments/comparative examples, the silver trace portions 120b with the thicknesses T1 of 1 µm and 2 µm were made of the silver paste with a viscosity of 1000 cp, the silver trace portions 120b with the thicknesses T1 of 3 µm and 4.5 µm were made of the silver paste with a viscosity of 30000 cp, the silver trace portions 120b with the thicknesses T1 of 6 µm, 7.5 µm, and 9 µm were made of the silver paste with a viscosity of 100000 cp, and the protective layer 130 was made of PMMA with a water vapor permeability of 1230 g/(m²×day). In addition, the electrical test results shown in Table 1 are obtained through the aforementioned resistance measurement method, and when the electrical test result is expressed as "pass", it means that the electrical performance (electrical specifications) of the touch sensor at least met the relationships of the aforementioned Equation (1) and Equation (2), and when the electrical test result is expressed as "fail", it means that the electrical performance of the touch sensor at least did not meet one of the aforementioned Equation (1) and Equation (2). It should be understood that without exceeding the scope of the present disclosure, the touch sensor in Table 1 should not be used to limit the present disclosure.

TABLE 1

| Electrical Properties of Touch Sensors after Salt Spray Test | | Thickness T2 of Protective Layers Covering Silver Trace Portions (µm) | | | | | |
|---|---|---|---|---|---|---|---|
| | | 0.5 | 1.0 | 1.5 | 2 | 2.5 | 3.0 |
| Thickness T1 of Silver Trace (µm) | 1.0 | Pass | Pass | Pass | Pass | Pass | Pass |
| | 2.0 | | | | | | |
| | 3.0 | Fail | | | | | |
| | 4.5 | | | | | | |
| | 6.0 | | | Fail | | | |
| | 7.5 | | | | | | |
| | 9.0 | | | | Fail | | |

It can be seen from the electrical results in Table 1 that when the thickness T2 of the protective layer 130 covering the silver trace portion 120b is greater than or equal to 20% of the thickness T1 of the silver trace portion 120b, and the sum of the thickness T1 of the silver trace portion 120b and the thickness T2 of the protective layer 130 covering the silver trace portion 120b is less than or equal to 12 µm (i.e., when the thickness T2 of the protective layer 130 and the thickness T1 of the silver trace portion 120b meet the relationships of the aforementioned Equation (3) and Equation (4)), the touch sensor can pass the electrical specifications defined in the present disclosure through electrical measurement after the salt spray test. From this, it can be seen that the design of the relationships between the thickness T2 of the protective layer 130 and the thickness T1 of the silver trace portion 120b of the present disclosure can ensure that the touch sensor 100 still provide a normal operation function after the salt spray test, which effectively improves the reliability of touch sensor.

Figure 4:
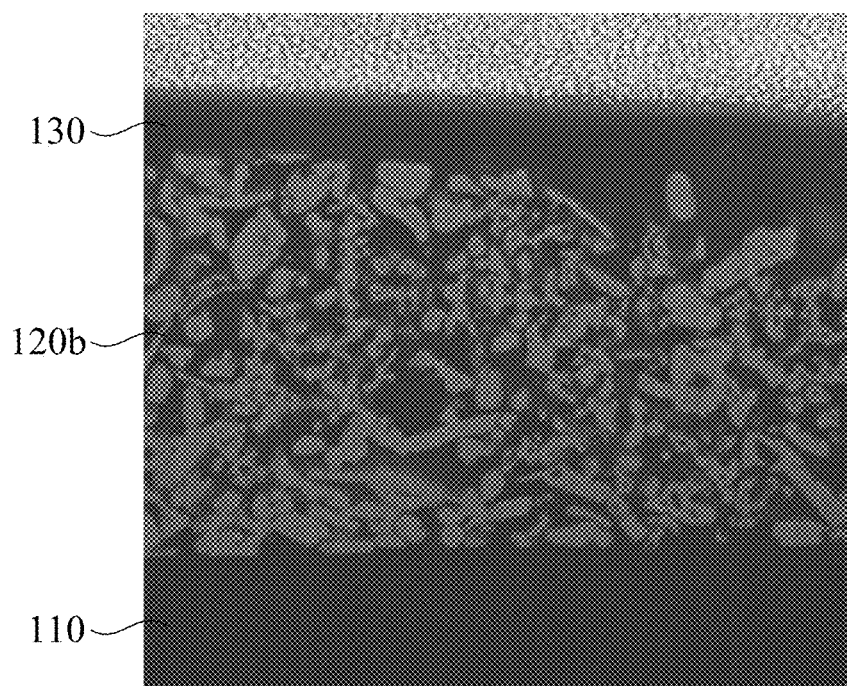
FIG. 4 is a scanning electron microscope (SEM) image of a touch sensor after being subjected to a salt spray test.

On the other hand, FIG. 4 is a scanning electron microscope (SEM) image of a touch sensor after being subjected to a salt spray test when the thickness T1 of the silver trace portion 120b and the thickness T2 of the protective layer 130 in Table 1 did not meet the relationship of Equation (3). More specifically, in the touch sensor of FIG. 4, the thickness T1 of the silver trace portion 120b is 7.1 µm, and the thickness T2 of the protective layer 130 is 1.1 µm. It is worth noting that under the scale of the scanning electron microscope, it can be seen that although the protective layer 130 was not pierced and damaged by the silver trace portion 120b, and the silver trace portion 120b was not exposed by the protective layer 130, but the silver trace portion 120b had actually been defective. From this, it can be seen that in the art, it is impossible to accurately judge whether the protective layer 130 and the silver trace portion 120b have changed and the specific degree of change after the salt spray test by naked-eye inspections. In particular, since the silver trace portion 120b is covered by the protective layer 130, it is more difficult to judge whether the silver trace portion 120b have changed and the specific degree of change after the salt spray test from the appearance of the silver trace portion 120b. Therefore, it can be proved that one cannot effectively judge whether the structure of the touch sensor is still complete after the salt spray test and whether the touch sensor provides the function that meets the electrical specifications after the salt spray test by simply observing the appearance of the touch sensor.

According to the aforementioned embodiments of the present disclosure, since in the touch sensor of the present disclosure, there is a special relationship between the thickness of the protective layer and the thickness of the silver trace portion, and the material properties (e.g., the water vapor permeability) of the protective layer are also properly adjusted and screened, it is helpful to improve the protection of the protective layer to the silver trace portion, and avoid the problems of structural defects and electrical failure caused by the water vapor erosion of the silver trace portion. The present disclosure conducts electrical tests on the touch sensor after the salt spray test. The test results show that after the touch sensor of the present disclosure is subjected to the salt spray test, the resistance change rate of any one of the sensing channels is low, and the resistance distribution difference between the sensing channels is low, having the electrical specifications defined by the present disclosure. From this, it can be seen that when inspected by the electrical test which is more rigorous and accurate compared to the appearance inspection, the touch sensor of the present disclosure can be ensured to provide a normal operation function after the salt spray test.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A touch sensor having a visible area and a peripheral area adjacent to at least one side of the visible area, the touch sensor comprising:
    a substrate;
    a plurality of sensing channels disposed at intervals on a surface of the substrate, wherein each of the sensing channels extends from the visible area to the peripheral area to form an electron transferring path across the visible area and the peripheral area, and comprises:
        an electrode portion; and
        a silver trace portion electrically connected to the electrode portion;
        wherein the electrode portion and the silver trace portion are on a same horizontal plane; and
    a protective layer disposed on the substrate and covering and encapsulating the sensing channels;
    wherein the sensing channels and the protective layer are configured to withstand a salt spray test, and, after the touch sensor is subjected to the salt spray test with sodium chloride solution of a mass percentage concentration of 5% at a rate of 1 mL/H to 2 mL/H under an ambient temperature of 35° C. for 48 hours, a resistance change rate of any one of the sensing channels is less than or equal to 10%, and a resistance distribution difference between the sensing channels is less than or equal to 10%.

2. The touch sensor of claim 1, wherein the protective layer directly contacts a carrying surface of the substrate and a top surface of the silver trace portion, the protective layer has an upper surface facing away from the substrate, and a vertical distance between the upper surface of the protective layer and the top surface of the silver trace portion is greater than or equal to 20% of a thickness of the silver trace portion.

3. The touch sensor of claim 2, wherein a sum of the vertical distance between the upper surface of the protective layer and the top surface of the silver trace portion and a vertical distance between the top surface of the silver trace portion and the carrying surface of the substrate is less than or equal to 12 μm.

4. The touch sensor of claim 2, wherein a thickness of the silver trace portion is greater than or equal to 1 μm and less than or equal to 9 μm.

5. The touch sensor of claim 1, wherein a water vapor permeability of the protective layer is greater than or equal to 400 g/(m$^2$×day) and less than or equal to 1500 g/(m$^2$×day).

6. The touch sensor of claim 1, wherein the electrode portion is a metal nanowire electrode portion comprising a matrix and a plurality of metal nanowires distributed in the matrix.

7. The touch sensor of claim 6, wherein at least any one of the sensing channels further comprises:
    a metal nanowire trace portion, wherein the metal nanowire trace portion and the silver trace portion are disposed in a stack, the metal nanowire trace portion is between the silver trace portion and the substrate, the metal nanowire trace portion is connected to the metal nanowire electrode portion, the metal nanowire trace portion and the metal nanowire electrode portion are on a same horizontal plane, and the metal nanowire trace portion and the silver trace portion at least constitute a peripheral circuit of the touch sensor.

8. The touch sensor of claim 7, wherein the protective layer directly contacts a carrying surface of the substrate and a top surface of the silver trace portion, the protective layer has an upper surface facing away from the substrate, a vertical distance between the upper surface of the protective layer and the top surface of the silver trace portion is greater than or equal to 20% of a thickness of the silver trace portion, and a sum of the vertical distance between the upper surface of the protective layer and the top surface of the silver trace portion and a vertical distance between the top surface of the silver trace portion and the carrying surface of the substrate is less than or equal to 12 μm.

9. The touch sensor of claim 1, wherein the electrode portion has a mesh pattern.

10. The touch sensor of claim 1, wherein the electrode portion at least constitutes a touch electrode of the touch sensor, and the silver trace portion at least constitutes a peripheral circuit of the touch sensor.

* * * * *